(12) United States Patent
Ebert

(10) Patent No.: US 11,819,033 B2
(45) Date of Patent: Nov. 21, 2023

(54) CLIP DETECTION

(71) Applicant: Poly-clip System GmbH & Co. KG, Hattersheim (DE)

(72) Inventor: Detlef Ebert, Bad Nauheim (DE)

(73) Assignee: Poly-clip System GmbH & Co. KG, Hattersheim (DE)

( * ) Notice: Subject to any disclaimer, the term of this patent is extended or adjusted under 35 U.S.C. 154(b) by 119 days.

(21) Appl. No.: 16/750,797

(22) Filed: Jan. 23, 2020

(65) Prior Publication Data

US 2020/0236952 A1      Jul. 30, 2020

(30) Foreign Application Priority Data

Jan. 25, 2019   (EP) .................................... 19153787

(51) Int. Cl.
*A22C 11/02* (2006.01)
*A22C 11/12* (2006.01)

(52) U.S. Cl.
CPC ............ *A22C 11/125* (2013.01); *A22C 11/02* (2013.01)

(58) Field of Classification Search
CPC ........ A22C 11/125; A22C 11/02; B65B 51/04
See application file for complete search history.

(56) References Cited

U.S. PATENT DOCUMENTS

| | | |
|---|---|---|
| 5,083,970 A | 1/1992 | Reutter |
| 6,112,499 A | 9/2000 | Lyskawa et al. |

(Continued)

FOREIGN PATENT DOCUMENTS

| | | |
|---|---|---|
| CN | 102885123 A | 1/2013 |
| EA | 201650065 A1 | 4/2018 |

(Continued)

OTHER PUBLICATIONS

CNIPA; Application No. 202010069294.9; Office Action dated Apr. 8, 2021.

(Continued)

*Primary Examiner* — Chelsea E Stinson
(74) *Attorney, Agent, or Firm* — Fitch, Even, Tabin & Flannery LLP

(57) ABSTRACT

The present invention relates to a clipping machine and a method for producing sausage-shaped products, like sausages, containing a flowable filling material in a tubular or bag-shaped packaging casing, and a guide unit for use in a clipping machine. The clipping machine comprises a filling tube for feeding filling material into the tubular or bag-shaped packaging casing stored on the filling tube and being closed at the front end by a closure means, like a closure clip, a casing brake assembly arranged on the filling tube, for applying a braking force to the tubular or bag-shaped packaging casing while being pulled-off from the filling tube, gathering means for gathering the filled tubular or bag-shaped packaging casing and for forming a plait-like portion thereto and a clipping device for placing and closing at least one closure means on the plait-like portion and a guide unit for guiding the closure means towards the clipping device. The guide unit comprises at least one sensing device having a first sensor element determining the presence or absence of a closure means in the guide unit.

13 Claims, 4 Drawing Sheets

(56) References Cited

U.S. PATENT DOCUMENTS

| | | | | |
|---|---|---|---|---|
| 7,475,521 | B2* | 1/2009 | Topfer | A22C 11/125 53/138.4 |
| 9,573,708 | B2* | 2/2017 | Jens | B65B 61/06 |
| 9,598,193 | B2* | 3/2017 | Hanten | A22C 11/125 |
| 9,615,589 | B2* | 4/2017 | Ebert | A22C 11/0245 |
| 10,005,578 | B2* | 6/2018 | Sames | A22C 11/125 |
| 2014/0000216 | A1* | 1/2014 | Jens | B65B 7/06 53/289 |
| 2016/0095326 | A1* | 4/2016 | Ebert | A22C 11/0245 452/35 |
| 2017/0172164 | A1* | 6/2017 | Ebert | A22C 11/02 |

FOREIGN PATENT DOCUMENTS

| | | |
|---|---|---|
| EP | 2684459 A1 | 1/2014 |
| EP | 2684460 A1 | 1/2014 |
| EP | 3281530 A1 | 2/2018 |
| RU | 2386573 C2 | 4/2010 |
| RU | 2543295 C2 | 2/2015 |

OTHER PUBLICATIONS

EPO; Application No. 19153787.7; Extended European Search Report dated Jul. 10, 2019.
Russian Patent Office; Application No. 2020102653/10 (004011); Decision to Grant dated May 22, 2020.

* cited by examiner

CLIP DETECTION

CROSS-REFERENCE TO RELATED APPLICATION

The present application claims the benefit of priority of European Patent Application No. 19153787.7 filed on Jan. 25, 2019, the content of which is incorporated herein by reference in its entirety.

FIELD OF THE INVENTION

The present invention relates to a clipping machine for producing sausage-shaped products, like sausages, containing a flowable filling material in a tubular or bag-shaped packaging casing, a guide unit for guiding closure means in a clipping machine and a method for producing said sausage-shaped products.

BACKGROUND OF THE INVENTION

In practice, it is known that, for example in the production of sausage-shaped products, like sausages, filling material is fed by a filling machine through a filling tube of a clipping machine into a tubular or bag-shaped packaging casing which can be stored on said filling tube and which is closed at its front end by a closure clip as a closure means, i.e. the end of the packaging casing pointing in the feeding direction of the filling material. The tubular or bag-shaped packaging casing is pulled-off from the filling tube while being filled by the feeding pressure. A casing brake assembly can be positioned in the region of the front end of the filling tube, i.e. the end of the filling tube facing in the feeding direction of the filling material, in order to apply a frictional force to the tubular or bag-shaped packaging casing while being pulled-off from the filling tube.

After a predetermined volume of filling material has been filled into said tubular or bag-shaped packaging casing, a displacer arrangement or gathering means, respectively, with a first and a second displacer unit which can each be formed by a pair of reversibly moveable displacement elements, gathers the filled tubular or bag-shaped packaging casing and shapes a plait-like portion thereto. A clipping device of the clipping machine then places and closes at least one closure clip at the plait-like portion forming the rear end of the sausage-shaped product, i.e. the end pointing against the feeding direction by respective closing tools which are reversibly movable towards the plait-like portion. The clipping device comprises a first and second closure tool cooperating with each other for closing at least one clip at the plait-like portion by reversibly moving at least one of the two closure tools towards the other or by reversibly moving both closure tools towards each other. On these known clipping machines, the closure means are provided as a supply of closure clips, like a line of clips wound on a reel. The line of clips is supplied towards the closing region of the clipping machine such that the front most clip in the line of clips is positioned in one of the closure tool, or in a position in which the closure clip may be grasped by said closure tool, placed and closed by said closure tool at the plait-like portion formed by the displacer arrangement in cooperation with a second closure tool. An operator recognizes the emptied clip reel or the rear end of the line of clips leaving said clip reel, and stops the clipping machine for refilling the supply of closure clips by installing a new clip reel.

Due to the high production rate of clipping machines and the short distance between the clip reel installed on the clipping machine, and the machine housing, the rear end is pulled inside the clipping machine between the time of recognizing the empty supply of clips and stopping the clipping machine by the operator.

After the clipping machine has been stopped, the remaining line of clips located inside the clipping machine and extending towards the closing region has to be removed from the clipping machine prior to installing a new clip reel. For removing the remaining closure clips from the clipping machine, the operator grasps the front end of the remaining line of clips that is positioned near the closing region, and pulls it out of the clipping machine in the feeding direction of the closure clips.

Since the clipping machine has to be opened, the removal of the remaining line of clips from the clipping machine is time and work intensive. Moreover, the operator may accidentally miss to stop the clipping machine in time, which may lead to production losses or additional downtime of the clipping machine.

Thus, it is an object of the present invention to provide a clipping machine, a guide unit for guiding closure means in a clipping machine, and a method for producing sausage-shaped products with a reduced amount of work and down time of the clipping machine.

SUMMARY OF THE INVENTION

According to the present invention, there is provided a clipping machine for producing sausage-shaped products, like sausages, containing a flowable filling material in a tubular or bag-shaped packaging casing. The clipping machine comprises a filling tube for feeding filling material into the tubular or bag-shaped packaging casing stored on the filling tube and being closed at the front end by a closure means, like a closure clip, a casing brake assembly arranged on the filling tube, for applying a braking force to the tubular or bag-shaped packaging casing while being pulled-off from the filling tube, gathering means for gathering the filled tubular or bag-shaped packaging casing and for forming a plait-like portion thereto, and a clipping device for placing and closing at least one closure means on the plait-like portion.

The inventive clipping machine further comprises a guide unit for guiding the closure means towards the clipping device, with the guide unit comprising at least one sensing device having a first sensor element for determining or representing or detecting the presence or absence of a closure means in the guide unit.

By providing a sensing device with such a first sensing element, the presence or absence of a closure means in the guide unit may reliably be indicated by said first sensing element. The sensing device may output a signal to the operator and/or may automatically stop the clipping machine in order to timely inform the operator and/or to avoid production losses.

The determination or detection of the presence or absence of a closure means in the guide unit by the first sensor element may be realized in various ways. The first sensing element may have a specific design and/or may be made of a material that changes one or more of its features dependent on the presence or absence of a closure means in the guide unit. In the latter case, the feature can be the permeability or inductivity, e.g. when designed as a coil or a part thereof.

The representation, determination or detection of the presence or absence of a closure means in the guide unit by the first sensor element may also be realized by a change of its interaction with further elements or devices. The first sensor element may be part of an electric or electronic circuit in which information is transferred. The presence or absence of a closure means in the guide unit may influence the first sensor element in such a manner that the information transferred in said circuit varies in a defined way, e.g. by interrupting said circuit or varying the resistance of the first sensor element.

Alternatively, the surface of the first sensor device may be equipped with specific features regarding the reflection of an energy beam by said surface, like a light beam or an ultrasonic beam. The specific features of the surface may cause the energy beam to be fully reflected to its source, or to be deflected away from its source, dependent on the angle of an energy beam sent to said surface.

The first sensor element may be in direct contact with the closure means present in the guide unit, and accordingly, without direct contact in case of the absence of closure means in the guide unit. However, it is also possible that a direct contact between the first sensor element and the closure means is not necessary for representing or determining or detecting the presence or absence of a closure means in the guide unit by the first sensor element.

In a preferred embodiment of the inventive clipping machine, the position or the movement of the first sensor element of the at least one sensing device indicates the presence or absence of a closure means in the guide unit. The first sensor element may be arranged in a position indicating the presence of a closure means in the guide unit. If the first sensor element is not in this position, it may indicate the absence of a closure means in the guide unit, and vice versa. However, it may also be sufficient to detect the movement of the first sensor element, e.g. between said first and second positions, to reliably indicate the presence or absence of a closure means in the guide unit.

It is of advantage that the at least one sensing device has a second sensor element for detecting the position or the movement of the first sensor element. The second sensor element may thereby generate a respective signal for informing the operator and/or for causing the clipping machine to be stopped.

In order to reliably guide the closure means towards the closing tools, and for securely indicating the presence or absence of a closure means in the guide unit, the guide unit has at least one guide groove for guiding the closure clips towards the clipping device, with the sensing device aligned with the guide groove.

In the case that only one clip has to be placed and closed on the plait-like portion formed to the filled tubular casing, it may be sufficient that the guide unit has only one guide groove for the closure means.

In the case that two closure means or clips have to be placed and closed on the plait-like portion, one for closing the rear end of the actually filled portion of the tubular casing and a second closure clip for closing the front end of the subsequent casing portion, it is preferred that the guide unit has a second guide groove for guiding the closure clips towards the clipping device, and a second sensing device aligned with the second guide groove. Thereby the presence or absence of closure means in both guide grooves of the guide unit may be indicated. In accordance with the first sensing device, also the second sensing device may have a first sensor element representing or determining or detecting the presence or absence of a closure means in the guide unit as well as optionally a second sensor element.

In a further preferred embodiment of the inventive clipping machine, the one or two first sensor elements are at least partially arranged outside a housing of the clipping machine. In this configuration, said first sensor elements may provide a visible indication regarding the presence or absence of a closure means in the guide unit to the operator. Moreover, for installing a new supply of closure means on the clipping machine, at least the one or two first sensor elements are accessible to the operator without opening the housing of the clipping machine.

The supply of clips is usually arranged vertically above the housing of the clipping machine. In order to reduce the required installation space of the clipping machine, and to shorten the length of the line of clips extending between the supply of closure means and the closing tools, the guide unit may be positioned inside the clipping machine, and the first sensor element exceeds the housing of the clipping machine, preferably, the top surface of said housing, thereby representing the presence or absence of a closure clip in the guide unit.

For further improving the reliability of the sensing device, the first sensor element may be movable between at least two positions. Particularly, the first sensor element may be movable between a first position representing the presence of a closure means in the guide unit, and a second position representing the absence of a closure means in the guide unit.

The present invention further relates to a guide unit for use in a clipping machine for producing sausage-shaped products, as explained in the foregoing.

The guide unit for guiding the closure means towards the clipping device comprises at least one sensing device having a first sensor element representing or determining or detecting the presence or absence of a closure means in the guide unit.

The inventive guide unit may be provided as a retrofit component for existing clipping machines.

In one embodiment of the inventive guide unit, the position or the movement of the first sensor element of the at least one sensing device indicates the presence or absence of a closure means in the guide unit.

Also in the inventive guide unit, the at least one sensing device has a second sensor element for detecting the position or the movement of the first sensor element.

The guide unit may have at least one guide groove for guiding the closure clips towards the clipping device, with the sensing device aligned with the guide groove.

The inventive guide unit thereby provides all advantages explained in conjunction with the inventive clipping machine.

The present invention further relates to a method for producing sausage-shaped products, like sausages, containing a flowable filling material in a tubular or bag-shaped packaging casing, on a clipping machine. The method comprises the steps of feeding the filling material in a feeding direction into the tubular or bag-shaped packaging casing stored on a filling tube and being closed at the front end by a closure means, like a closure clip, gathering the filled tubular or bag-shaped packaging casing by gathering means arranged downstream the filling tube, for forming a plait-like portion thereto, and placing and closing at least one closure means on the plait-like portion by a clipping device, for closing the filled tubular or bag-shaped packaging casing.

According to the present invention, the method further comprises the steps of guiding the closure means towards the clipping device by a guide unit and representing or determining or detecting the presence or absence of a closure means in the guide unit by at least one first sensor element.

The inventive method may further comprise the additional step of, upon indication of the absence of closure means, reversing the feed of closure means towards the clipping device, for removing the remaining closure means in the guide unit.

Further additionally or alternatively, the inventive method may comprise the step of stopping the clipping machine by indicating the absence of the closure means in the guide unit.

The method for producing sausage-shaped products, according to the present invention, provides the same advantages as explained in conjunction with the inventive clipping machine.

Moreover, the reversal of the feed of closure means facilitates the removal of the remaining line of clips from the clipping machine, and thereby shortens the time of installing a new supply of closure means.

Additionally, the inventive method enables the clipping machine to be stopped in time, upon detection of the absence of closure clips in the guide unit, not only in the case that the supply of closure clips is emptied but also in the case of an accident, e.g. when the line of clips received from the supply is broken.

Further advantages and preferred embodiments of the present invention will be described in the following together with the drawings listed below. The expressions "left", "right", "below" and "above" used in the following description, are referred to the drawings in an alignment such that the reference numbers and the notation of the figures used can be read in normal orientation.

DETAILED DESCRIPTION

Figure 1:
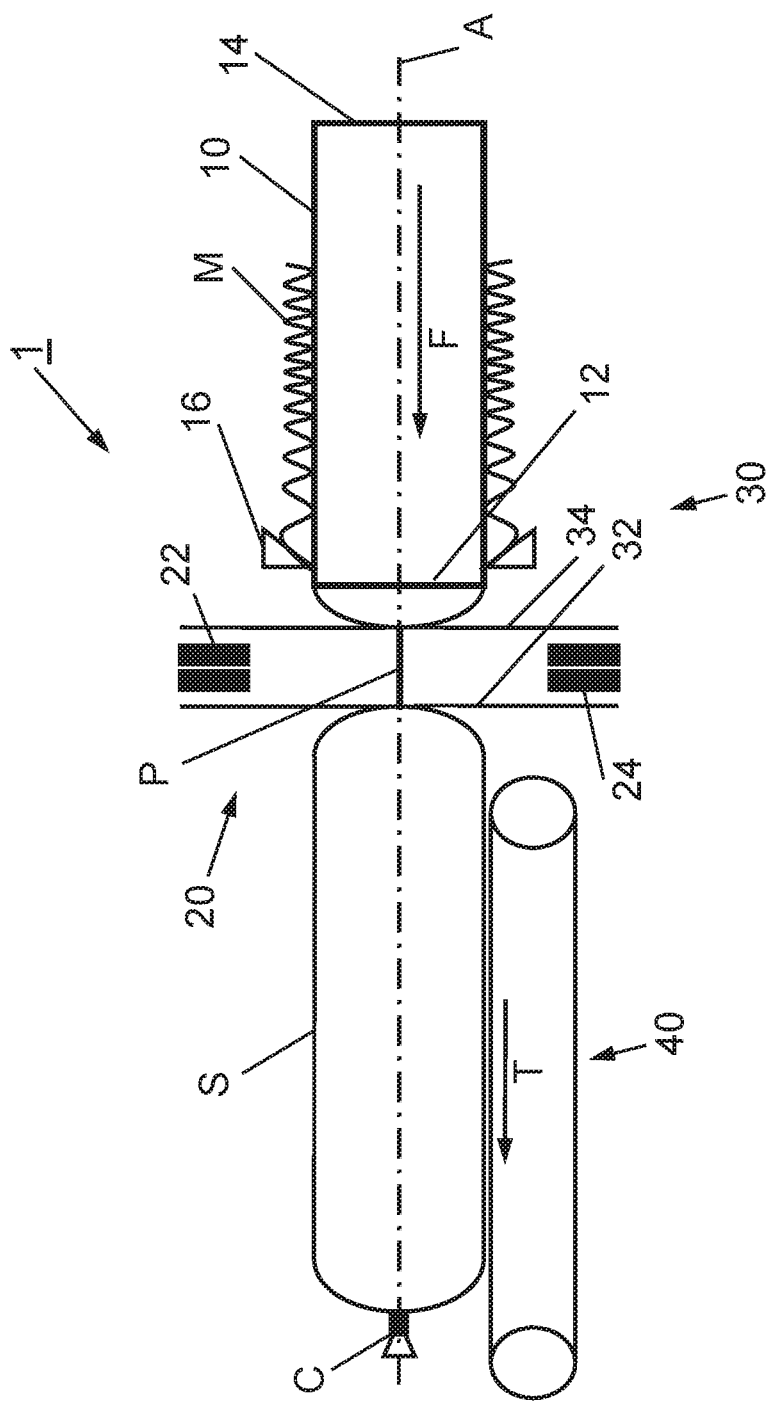
FIG. 1: is a schematic view showing the principal design of a clipping machine.

A clipping machine 1 for producing sausage-shaped products S, like sausages, which contain a flowable filling material in a tubular or bag-shaped packaging casing M, is shown schematically in FIG. 1, in particular its closing region. Clipping machine 1 comprises a filling tube 10 having a longitudinally and horizontally extending central axis A, with a discharge opening for discharging the filling material at its left end 12 and a feeding opening for feeding the filling material in a feeding direction F to the discharge opening of filling tube 10, for example by a feeding pump (not shown), at its right end 14. Moreover, a casing brake assembly 16 is arranged on and coaxially with filling tube 10 in the region of the left end 12 of filling tube 10. Filling tube 10 is made of a suitable material, like stainless steel.

A supply of tubular packaging casing M made of a thin sheet material is stored on filling tube 10 in a folded manner like a concertina. From the supply of tubular packaging casing M, tubular packaging casing M is pulled-off during the process of producing the sausage-shaped products S, in particular by the feeding pressure for filling the filling material into tubular packaging casing M wherein casing brake assembly 16 provides a braking force for allowing a controlled pulling-off of tubular packaging casing M during the filling process.

Clipping machine 1 further comprises a clipping device 20 for closing a filled tubular packaging casing M by applying closure means, like closure clips or closing clips C, to a plait-like portion P, and gathering means 30 for gathering the filled tubular packaging casing M and forming said plait-like portion P thereto. These components are all arranged downstream filling tube 10.

As can be inferred from FIG. 1, clipping device 20 is positioned immediately downstream left end 12 of filling tube 10, and coaxially aligned to filling tube 10. Clipping device 20 comprises a first and a second clipping tool 22, 24 formed by a punch 22 and a die 24. It has to be noted that punch 22 and die 24 may apply and close a single closure clip C for closing the just filled tubular packaging casing M, or may apply and close two closure clips C at the same time, a first closure clip C for closing the rear end of the just filled tubular packaging casing M for forming a sausage-shaped product S, and a second closure clip C for closing the front end of a tubular packaging casing M subsequently to be filled.

Gathering means 30 include a first displacer unit 32 and a second displacer unit 34, wherein first displacer unit 32 is positioned downstream second displacer unit 34. First and second clipping tools 22, 24 of clipping device 20 may be positioned between first and second displacer units 32, 34, at least for applying and closing one or two closure clips C to plait-like portion P. First displacer unit 32 can reversibly be moved parallel to feeding direction F of the filling material.

For discharging a sausage-shaped product S just produced from clipping machine 1, in a transportation direction T being substantially the same as feeding direction F, a discharge device 40 is arranged downstream clipping device 20, which may be a belt conveyor comprising a conveyor belt and guide rollers. In a simple case, discharge device 40 may be a chute.

Figure 2:
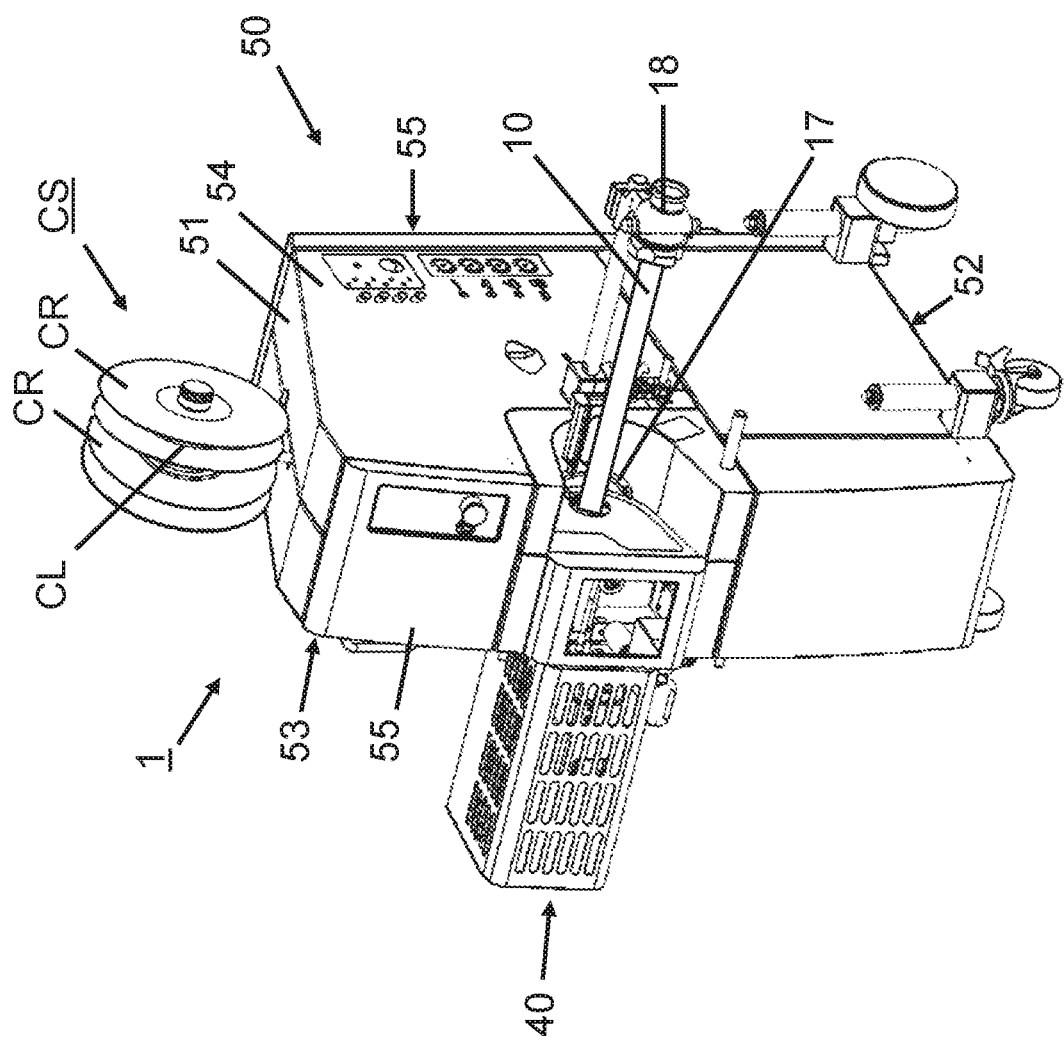
FIG. 2: is a perspective view of a clipping machine.

FIG. 2 shows a three-dimensional view of an embodiment of a clipping machine 1, in which the principle design as explained in conjunction with FIG. 1 is realized.

Clipping machine 1, additionally to the components shown in FIG. 1 and explained above, has a housing 50 with a top surface 51, a bottom surface 52, side surfaces 53, 54, a rear surface 55 and a front surface 55.

In FIG. 2, casing brake assembly 16 has been omitted. Only a holder 17 for casing brake assembly 16 is shown. Additionally, a hinge 18 is shown, to which filling tube 10 is connected and from which it extends towards clipping device 20. Moreover, discharge device 40 is covered by a protecting grid 42.

As further can be seen in the embodiment of a clipping machine 1 according to FIG. 2, a supply CS of closure means or clips C is arranged above clipping machine 1. Clip supply CS includes two clip reels CR on which closure clips C are stored in the form of a line of clips CL wound on reels CR. The line of clips or clip line CL enters clipping machine 1 through top surface 51 of housing 50, and is guided to the closing region of clipping device 20. A clip feed device (not shown) pulls clip lines CL stepwise from clip reels CR in accordance with the clipping cycle. The clip feed device may be a separate device, or may be part of clipping device 20.

Figure 3:
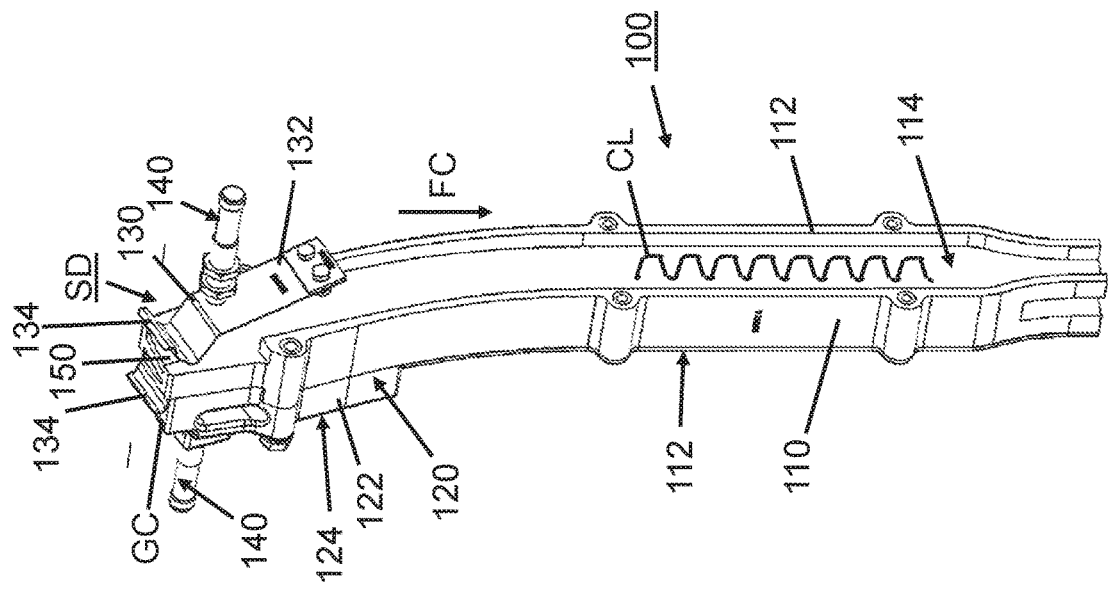
FIG. 3: is a perspective view of a guide unit according to the present invention.
Figure 4:
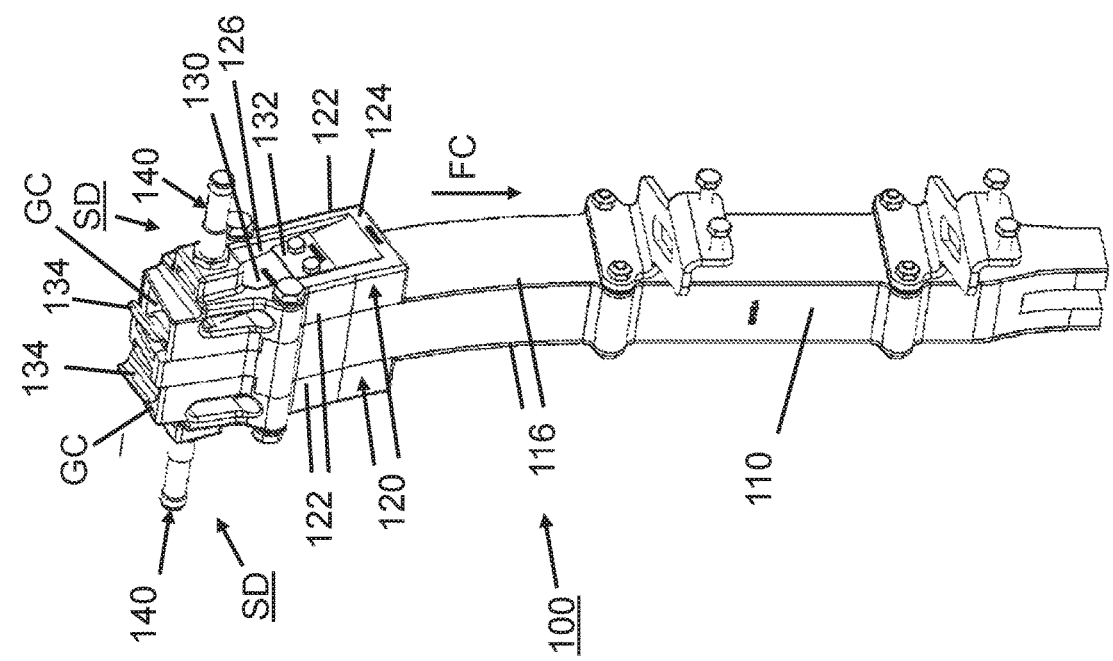
FIG. 4: is a perspective view of the guide unit as shown in FIG. 3.

FIGS. 3 and 4 show a perspective view of a guide unit 100 according to the present invention.

Guide unit 100 has a longitudinally and vertically extending body 110 with side surfaces 112. Body 110 is slightly curved in a plane parallel to side surfaces 112. As can be seen in FIG. 4, in each side surface 112, a guide groove 114 is arranged, following the longitudinal extension of body 110. Each guide groove 114 is covered by a plate 116 for forming a guide channel GC through which clip line CL is guided towards closing region or clipping device 20 in a clip feed direction FC. In FIG. 4, plate 116 on the right side of guide unit 100 has been omitted.

The width of the lower end of guide unit 100 is reduced, such that also the width of guide channel GC in body 110 is reduced for a precise guidance of clip line CL (cf. FIG. 4).

In the region of the upper end of guide unit 100, the lateral boundaries of groove 114 have been omitted. At the upper end, a coverage 120 is mounted on each side of body 110 of guide unit 100 which includes respective side surface 112 of body 110. Coverage 120 has an approximately U-shaped cross-section with side surfaces 122 forming the lateral boundaries of guide groove 114 and a top surface 124 which forms the coverage of groove 114 at the upper end of guide unit 100. Coverage 120 has an approximately rectangular recess 126 in its top surface 124. Recess 126 has a width which at least approximately matches the width of guide channel GC. In FIG. 4, coverage 120 on the right side of guide unit 100 has been omitted, either. Also in FIG. 4, a portion of a clip line CL is exemplarily shown in a position in which clip line CL passes guide unit 100 within guide channel GC.

Two approximately identical sensing devices SD are provided at each side of guide unit 100 and in the region of its upper end and on the sides of side surfaces 112. Each sensing device SD includes a first sensor element 130 which has a substantially flat design, and which extends along the upper end of guide unit 100. First sensor element 130 has a lower end 132 facing in clip feed direction FC and an upper end 134 facing in the counter direction, namely towards clip supply CS, and has a width that corresponds at least substantially to the width of recess 126 in top surface 124 of coverage 120.

Lower end 132 of first sensor element 130 is mounted to top surface 124 of coverage 120, and second end 134 of first sensor element 130 extends from top surface 124 of coverage 120 through recess 126 into guide channel GC in a direction contrary to clip feed direction FC.

Second end 134 of first sensor element 130 has a substantially U-shaped design with the bottom of the "U" facing towards body 110 of guide unit 100, in particular to recess 126 and, if no clip line CL is present in guide channel GC in the height of recess 126, into recess 126. In the latter case, first sensor element 130 is arranged such that the bottom of the U-shaped second end 134 abuts body 110 of guide unit 100 in the case that no closure clips C are present in the upper region of guide channel GC. This position of first sensor element 130 is referred as the second position. Moreover, second end 134 of first sensor element 130 exceeds the upper end of body 110 of guide unit 100, and thus, the upper end of guide channel GC (cf. FIGS. 4 and 5). First sensor element 130 is made of an elastic material, like a suitable plastic or steel.

Sensing device SD further includes a second sensor element 140 mounted to top surface 124 of coverage 120. Second sensor element 140 has a first end 142 and a second end 144, and is directed to first sensor device 130 with its first end 142. In the particular embodiment shown in FIGS. 2 to 5, first end 142 of second sensor element 140 is directed to a flat region of first sensor element 130 immediately below the U-shaped second end 134. Second sensor element 140 may thereby detect the position of first sensor element 130 relative to body 110.

Figure 5:
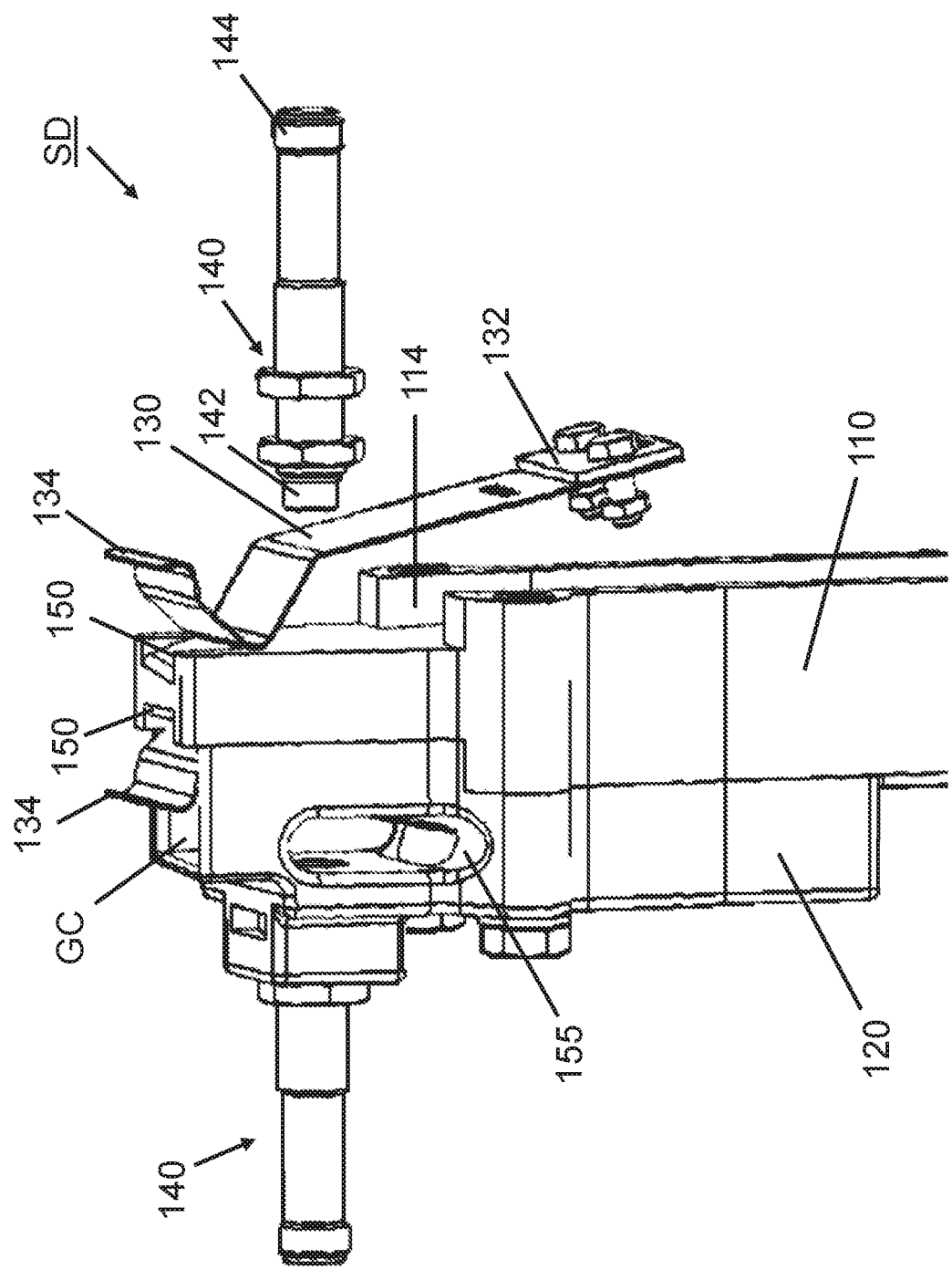
FIG. 5: is a detailed view of the guide unit as shown in FIGS. 3 and 4.

As further can be seen in FIGS. 3 to 5, at the upper end of body 110 of guide unit 100, each guide channel GC is provided with a guide chamfer 150 for supporting the insertion of a clip line CL into guide channel GC.

Moreover, each coverage 120 is provided with a recess 155 which extends through side surfaces 122 and in a direction perpendicular to clip feed direction FC, such that a visual inspection of guide channel GC in the region of sensing devices SD by an operator is possible. The height of recess 155 corresponds to the height of guide channel GC such that first sensor element 130 as well as clip line CL, if present, are visible.

It has to be understood that clipping machine 1 includes a control unit (not shown) for controlling the production process, and that sensing devices SD are coupled to said control unit.

For producing sausage-shaped products S, filling material is fed through filling tube 10 into tubular packaging casing M which is closed at its front end by a closure clip C. Filled tubular packaging casing M is gathered by gathering means 30, a plait-like portion is formed thereto and a closure clip C for closing the filled tubular packaging casing M is applied to plait-like portion P, forming a sausage-shaped product S. Together with closure clip C, a suspension loop may be attached to the closed end of sausage-shaped product S.

Before starting the production process, amongst others, a supply of clips CS in the form of one or two clip reels CR on which closure clips C as a line of clips CL are stored, is installed on clipping machine 1. The leading end of clip line CL is pulled-off from clip reel CR and guided via guide unit 100 to clipping device 20 in the closing region of clipping machine 1.

For inserting clip line CL into guide unit 100, second end 134 of first sensor element 130, which exceeds top surface 51 of housing 50 of clipping machine 1, is grasped by the operator and pushed away from body 110 of guide unit 100. The leading end of clip line CL is inserted into guide channel GC and pushed forward in clip feed direction FC until it reaches clipping device 20, where the front most closure clip C is placed in a starting position, like in one of clipping tools 22, 24, or in the clip feed device.

After clip line CL is placed in guide unit 100 between body 110 and first sensor element 130, first sensor element 130 is in a position close to second sensor element 140 of sensing device SD. First sensor element 130, in this position which is referred as the first position, represents the presence of closure clips C in guide unit 100.

Second sensor element 140 may detect first sensor element 130 in the first position close to second sensor element 140, and may output a respective signal to the control unit, which indicates that closure clips C are present in guide unit 100. Based on this signal, the start of the production process may be allowed.

During the production process, clip line CL is pulled-off from clip reel CR, and guided through guide device 100 towards clipping device 20.

While the supply of clips CS on clip reel CR is emptied, the trailing end of clip line CL passes sensor device SD. Thereby, first sensor element 130, kept away from body 110 of guide unit 100, moves into the second position towards body 110 until its U-shaped end 134 abuts body 110. First sensor element 130, in the second position, represents the absence of closure clips C in guide unit 100.

First sensor element 130 is thereby departed from second sensor element 140. Second sensor element 140 detects that first sensor element 130 has left the first position close to second sensor element 140, and outputs a respective signal to the control unit of clipping machine 1, or interrupts the signal which indicates first sensor element 130 in the first position close to second sensor element 140. On the basis of this signal, or by interrupting the signal indicating the presence of closure clips C in guide unit 100, the production process may be stopped.

Since second end 134 of first sensor element 130 exceeds top surface 51 of housing 50 of clipping machine 1, the operator gets a visual confirmation that the supply of clips CS is emptied, and in the case that two clip reels are installed, he may identify which of the two clip reels CR is emptied.

First sensor element 130 may be made of any suitable material. However, for enabling first sensor element 130 to be moved between its first and second positions, close to second sensor element 140 and departed therefrom when abutting body 110 of guide unit 100, first sensor element 130 should be made of an elastic material, like metal. Moreover, the material of first sensor element 130 should be selected such that first sensor element 130 may be detected by second sensor element 140, at least in the position close to second sensor element 140.

Second sensor element 140 may be a proximity sensor, for detecting first sensor element 130 in its position close to second sensor element 140. However, second sensor element 140 may be any suitable type of sensor element. Second sensor element 140 may be an induction sensor element detecting first sensor element 130 which then should be made of metal, or which may be of a different material and include a coil having at least one winding to be detected inductively.

Second sensor element 140 may also be an optical sensor element including a light emitting source. The light beam emitted by second sensor element 140 may be reflected by first sensor element 130. Depending on the position of first sensor element 130, the light beam is completely, only partially or not at all received by second sensor element 140 for indicating the presence or absence of closure clips C in guide unit 100.

It has to be understood that second sensor element 140 may include a receiver for receiving the light beam reflected by first sensor element 130. Alternatively, the receiver may be a separate element arranged in a suitable position for receiving said light beam.

Further alternatively to the degree of reflection of a light beam emitted by second sensor element 140 and which is received by second sensor element 140, the surface of first sensor element 130 may be conditioned such that the colour range or spectrum of the reflected light beam is changed dependent on the position of first sensor element 130.

Second sensor element 140 may further be suitable for detecting first sensor element 130 not only in the two extreme positions when abutting body 110 of guide unit 100 and when in close vicinity to second sensor element 140, but also in intermediate positions. First sensor element 130 may be positioned in such intermediate positions, e.g. when using closure clips C of different sizes, which may have different widths, respectively. Thereby, guide unit 100 is suitable for use with a wide range of closure clips C.

As can be seen in FIGS. 3 and 4, guide unit 100 includes two guide channels GC for simultaneously guiding two clip lines CL to a clipping device 20. Sensing devices SD are arranged on opposite sides of guide unit 100 and in identical heights, which means, in identical distances from the upper end of guide unit 100.

In this arrangement, upon detecting the trailing end of clip line CL when passing sensing devices SD, the remaining portions of clip lines CL between sensing devices SD and clipping device 20 are of identical length, which means that the number of closure clips C of these remaining portions are also identical.

Dependent on the design of clipping machine 1 and the size of closure clips C, the number of clips of the remaining portion of clip line CL in clipping machine 1 is known. Accordingly, it is possible to allow clipping machine 1 to produce a predetermined number of sausages S after sensor devices SD have detected the trailing end of clip line CL in guide unit 100. The control unit of clipping machine 1, which has all necessary information, controls the production process accordingly.

Alternatively, or additionally, after the supply of clips CS has emptied, and the empty clip reels CR have been removed from clipping machine 1, the clip feed device may be activated to feed clip line CL in the direction contrary to clip feed direction FC. Thereby, the remaining portion of clip line CL is fed out of guide unit 100 at its upper end, where it exceeds top surface 51 of housing 50 of clipping machine 1. An operator may grasp the exceeding end of clip line CL by hand for removing it from clipping machine 1 without disassembling clipping machine 1.

As particularly can be seen in FIG. 4, the design of second end 134 of first sensor element 130, namely by including a respectively inclined surface portion, supports the movement of clip line CL in this direction.

However, due to the fact that the number of closure clips C of the remaining portion of clip line CL is known, sensor devices SD may also be arranged at different positions on guide unit 100, for enabling clipping machine 1 to be controlled in the described manner.

It has to be noted that clip reels CR may be provided with information regarding closure clips C stored thereon, like the size and number of closure clips C, the kinds of products for which they may be used and so on. This information may be transmitted to clipping machine 1 which uses this information for controlling clipping machine 1 and the production process. The information may be stored on a label attached to clip reel CR, like a bare code label or an RFID-label.

As explained above, second sensor element 140 may emit a light beam which is reflected by first sensor element 130, for sensing the position of first sensor element 130, and for indicating the presence or absence of closure means C in guide unit 100. It is also possible that second sensor element 140 emits other kinds of beams, like ultrasonic or microwave beams for sensing the position of first sensor element 130.

Furthermore, first sensor element 130 may include an additional element, like a pin, that is positioned relative to second sensor element 140, dependent on the presence or absence of closure clips C in guide unit 100. This additional element may e.g. be a metal pin which moves relative to a coil as a part of second sensor element 140. The electric or magnetic features of said coil or a circuit, to which said coil is coupled, may be changed dependent on the position of first sensor element 130.

What is claimed is:

1. A clipping machine for producing sausage-shaped products containing a flowable filling material in a tubular or bag-shaped packaging casing, the clipping machine comprising:
- a filling tube for feeding filling material into the tubular or bag-shaped packaging casing stored on the filling tube and being closed at the front end by a closure means;
- a casing brake assembly arranged on the filling tube, for applying a braking force to the tubular or bag-shaped packaging casing while being pulled-off from the filling tube;
- gathering means for gathering the filled tubular or bag-shaped packaging casing and for forming a plait-like portion thereto; and
- a clipping device for placing and closing at least one closure means on the plait-like portion, including a first and a second clipping tool;
- wherein a guide unit for guiding the closure means towards the clipping device, comprising at least one sensing device having a first sensor element determining the presence or absence of a closure means in the guide unit, and
- wherein the guide unit has a longitudinally and vertically extending body with side surfaces and at least one guide groove arranged in one of said side surfaces for guiding the closure clips towards the clipping device and covered by a plate, with the sensing device aligned with the guide groove.

2. The clipping machine according to claim 1, wherein the position or the movement of the first sensor element of the at least one sensing device indicates the presence or absence of a closure means in the guide unit.

3. The clipping machine according to claim 2, wherein the at least one sensing device has a second sensor element for detecting the position or the movement of the first sensor element.

4. The clipping machine according to claim 2, wherein the first sensor element is movable between at least two positions.

5. The clipping machine according to claim 1, wherein the guide unit has a second guide groove for guiding the closure clips towards the clipping device, and a second sensing device aligned with the guide groove.

6. The clipping machine according to claim 1, wherein the first sensor element is at least partially arranged outside a housing of the clipping machine.

7. The clipping machine according to claim 6, wherein guide unit is positioned inside the clipping machine, and a second end of the first sensor element exceeds the housing of the clipping machine.

8. A guide unit for use in a clipping machine for producing sausage-shaped products, the clipping machine comprising:
- a filling tube for feeding filling material into the tubular or bag-shaped packaging casing stored on the filling tube and being closed at the front end by a closure means;
- a casing brake assembly arranged on the filling tube, for applying a braking force to the tubular or bag-shaped packaging casing while being pulled-off from the filling tube;
- gathering means for gathering the filled tubular or bag-shaped packaging casing and for forming a plait-like portion thereto; and
- a clipping device for placing and closing at least one closure means on the plait-like portion, including a first and a second clipping tool;
- wherein the guide unit for guiding the closure means towards the clipping device comprises at least one sensing device having a first sensor element determining the presence or absence of a closure means in the guide unit, and
- wherein the guide unit has a longitudinally and vertically extending body with side surfaces and at least one guide groove arranged in one of said side surfaces for guiding the closure clips towards the clipping device and covered by a plate, with the sensing device aligned with the guide groove.

9. The guide unit according to claim 8, wherein the position or the movement of the first sensor element of the at least one sensing device indicates the presence or absence of a closure means in the guide unit.

10. The guide unit according to claim 8, wherein the at least one sensing device has a second sensor element for detecting the position or the movement of the first sensor element.

11. A method for producing sausage-shaped products containing a flowable filling material in a tubular or bag-shaped packaging casing, on a clipping machine, the method comprising the steps of:
- feeding the filling material in a feeding direction into the tubular or bag-shaped packaging casing stored on a filling tube and being closed at the front end by a closure means;
- applying a braking force to the tubular or bag-shaped packaging casing while being pulled-off from the filling tube, by a casing brake assembly arranged on the filling tube;
- gathering the filled tubular or bag-shaped packaging casing by gathering means arranged downstream the filling tube, for forming a plait-like portion thereto; and
- placing and closing at least one closure means on the plait-like portion by a clipping device, including a first and a second clipping tool, for closing the filled tubular or bag-shaped packaging casing;
- the method further comprising the steps of:
- guiding the closure means towards the clipping device by a guide unit according to claim 9; and
- representing the presence or absence of a closure means in the guide unit by at least one first sensor element.

12. The method according to claim 11, further comprising the step of:
- upon indication of the absence of closure means in the guide unit, reversing the feed of closure means towards the clipping device, for removing the remaining closure means in the guide unit.

13. The method according to claim 11, further comprising the step of:
- stopping the clipping machine by indicating the absence of the closure means in the guide unit.

* * * * *